United States Patent [19]
Rendall et al.

[11] Patent Number: 5,783,280
[45] Date of Patent: Jul. 21, 1998

[54] RIGID THERMAL INSULATION

[75] Inventors: John S. Rendall; Massoud Ahghar, both of Albuquerque, N. Mex.

[73] Assignee: Solv-Ex Corporation, Albuquerque, N. Mex.

[21] Appl. No.: 726,958

[22] Filed: Oct. 7, 1996

Related U.S. Application Data

[60] Division of Ser. No. 429,195, Apr. 26, 1995, Pat. No. 5,589,023, which is a continuation-in-part of Ser. No. 183,477, Jan. 18, 1994, abandoned.

[51] Int. Cl.⁶ ..................................................... B32B 3/26
[52] U.S. Cl. ............... 428/131; 428/312.2; 428/312.4; 428/537.7; 428/703; 428/920; 428/921; 252/62; 423/551; 423/553; 423/556
[58] Field of Search ..................... 428/131, 312.2, 428/312.4, 537.7, 703, 920, 921; 252/62; 423/551, 552, 556

[56] References Cited

U.S. PATENT DOCUMENTS

| | | | |
|---|---|---|---|
| 1,655,718 | 1/1928 | Weiss et al. | 252/62 |
| 4,071,649 | 1/1978 | Jacquemin et al. | 428/215 |
| 4,839,222 | 6/1989 | Jain | 428/290 |
| 5,008,299 | 4/1991 | Tucker et al. | 521/159 |
| 5,055,428 | 10/1991 | Porter | 501/35 |
| 5,084,320 | 1/1992 | Barito et al. | 428/69 |
| 5,169,877 | 12/1992 | Tucker et al. | 521/159 |
| 5,171,346 | 12/1992 | Hallett | 65/21.4 |
| 5,589,023 | 12/1996 | Rendall et al. | 156/245 |

*Primary Examiner*—William P. Watkins, III
*Attorney, Agent, or Firm*—Thomas E. Schatzel; Law Offices of Thomas E. Schatzel A Prof. Corporation

[57] ABSTRACT

An insulation material comprising the double salt of aluminum potassium sulphate and method of producing such. Aluminum sulphate materials and potassium sulphate materials are combined to form aluminum potassium sulphate which is then dehydrated to remove the water of hydration. Porous forms are made by mixing the hydrated aluminum potassium sulphate with a binder before dehydration. The resultant dehydrated sulphate expands greatly to provide an insulative material which is of lightweight and inorganic.

6 Claims, 2 Drawing Sheets

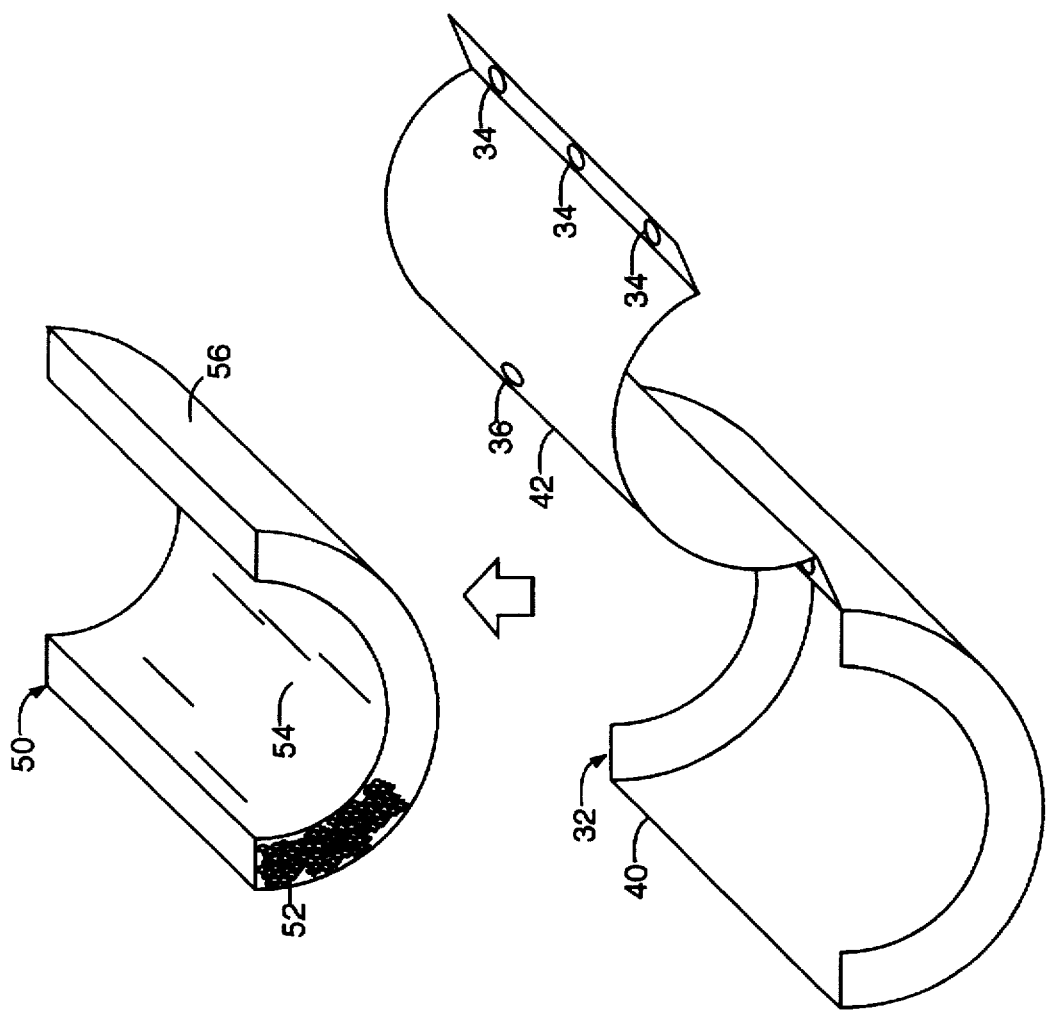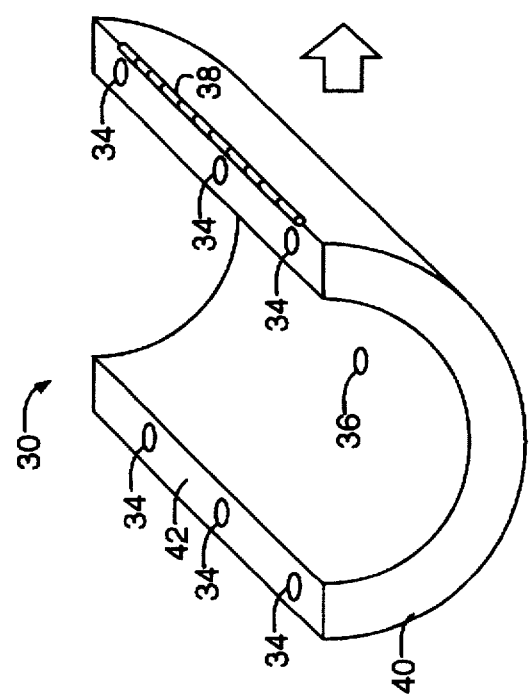

RIGID THERMAL INSULATION

RELATED APPLICATION

This is a divisional application of Ser. No. 08/429,195 filed Apr. 26, 1975 now U.S. Pat. No. 5,589,023, that issued Dec. 31, 1996 was filed Apr. 26, 1995, which in turn was a continuation-in-part of U.S. patent application Ser. No. 08/183,477, filed Jan. 18, 1994 now abandoned.

BACKGROUND OF THE INVENTION

1. Field of the Invention

This invention relates to insulation materials and more particularly to insulation materials comprising expanded foams of double salt of aluminum potassium sulphates of aluminum and potassium sulphate in rigid panels.

2. Description of the Prior Art

Material currently used for insulation purposes, such as fiberglass, is under review as potentially carcinogenous. Thus, efforts are under way to produce alternatives. Furthermore, the organic polyurethanes currently in use have environmental problems associated with fire which include black smoke and in some cases, CFC.

SUMMARY OF THE PRESENT INVENTION

It is an object of the present invention to provide an insulation material that is a lightweight substitute for ubiquitous conventional fiberglass insulation.

A further object of the present invention is to provide an insulation material with operating temperatures ranging from below freezing to in excess of 200° C.

It is a further object of the present invention to provide an insulation material from aluminum and potassium sulphate.

It is a further object of the present invention to provide an insulation material with operating temperatures as high as 850° C.

It is a further object of the present invention to provide an inorganic insulation material.

Another object of the present invention is to provide an insulation material that resists being ignited.

A preferred embodiment of the present invention includes an expanded aluminum potassium sulphate made from a double salt of aluminum potassium sulphate by using the expansion caused when removing the waters of hydration. This dehydrated double salt of aluminum potassium sulphate material provides an insulation filler at temperatures up to 500° C. and for higher temperatures, the dehydrated double salt of aluminum potassium sulphate may be calcined to produce a material of aluminum with potassium sulphate capable of use at temperatures exceeding 850° C.

An advantage of the present invention is that it provides an insulation material that is inorganic and therefore more benign than conventional materials.

Another object of the present invention is that it provides an insulation material containing aluminum and potassium sulphate.

Another advantage of the present invention is that is provides a lightweight insulation material.

Another advantage of the present invention is that it provides an insulation material that provides insulation for temperatures below freezing to temperatures exceeding 200° C.

Another advantage of the present invention is that it provides an insulation material that can be further calcined to provide insulation at temperatures exceeding 850° C.

These and other objects and advantages of the present invention will no doubt become obvious to those of ordinary skill in the art after having read the following detailed description of the preferred embodiment.

IN THE DRAWINGS

FIG. 1 is a flowchart of a process of the present invention for making rigid insulation in various molded shapes; and FIGS. 2A, 2B and 2C are perspective views of a mold and molded rigid insulation of the present invention diagrammed in a sequence similar to that of the method of FIG. 1.

DETAILED DESCRIPTION OF THE PREFERRED EMBODIMENT

Figure 1:
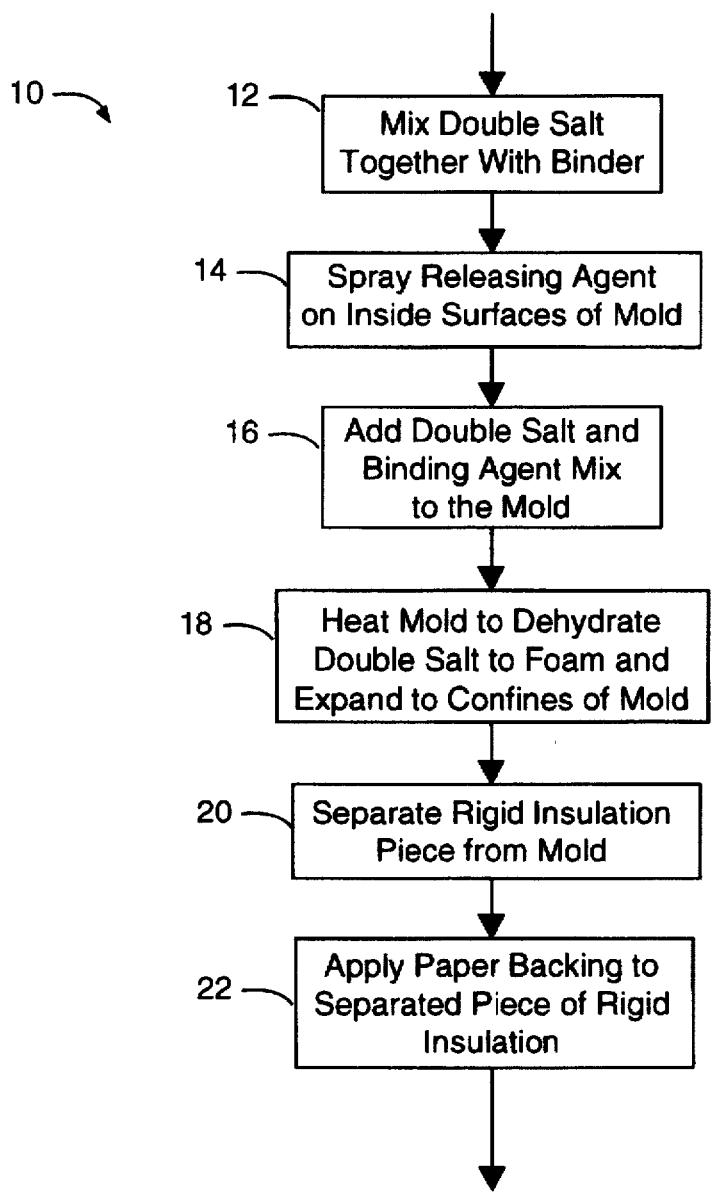

FIG. 1 illustrates a method for making panels and other shapes of rigid insulation, in an embodiment of the present invention, referred to herein by the general reference numeral 10. The method 10 comprises a step 12 of mixing a double salt of aluminum potassium sulphate, in powder form, $Al_2K_2(SO_4)_4 24H_2O$, preferably with three percent of a binding agent, also in powder form, comprised of equal parts of calcium sulphate $CaSO_4$, calcium silicate $CaSiO_4$ and calcium hydroxide $Ca(OH)_2$. One to four percent of binding agent to double salt of aluminum potassium sulphate can be used, but tests indicate that approximately three percent produces a rigid insulation that does not easily flake or crumble. A step 14 includes spraying a carbon mold-releasing agent to cover the inside surfaces of a chrome-plated carbon steel mold that defines a final shape for the rigid insulation. Wax is conventionally used for mold release, but dehydrating double salts of aluminum potassium sulphate are so sticky when they foam and expand that carbon has proven to be a better releasing agent. The carbon forms a thin film on the surface of the rigid insulation. A step 16 includes adding the mix of the double salt of aluminum potassium sulphate and the binding agent to the mold. A step 18 heats the mold and the mix to dehydrate the double salt of aluminum potassium sulphate, wherein the mix foams and expands to fill the inside surfaces of the mold and steam escapes from steam vents provided in the mold. A step 20 separates a now rigid state of the expanded foam of the dehydrated double salt of aluminum potassium sulphate and binding agent from the mold. A step 22 includes applying a protective paper covering to exposed surfaces of the expanded foam of the dehydrated double salt of aluminum potassium sulphate and binding forming a piece of rigid insulation. For example, ordinary gypsum wallboard conventionally has the paper backing contemplated for the step 22.

In one embodiment, the step 18 of heating comprises heating the mold to 250° C. at a temperature rate increase of approximately 50° C. each three minutes. Such a controlled heating provides for the uniform foaming of the double salt of aluminum potassium sulphate as it dehydrates and this has the beneficial effects of producing a strong rigid insulation with a high R-value.

In an alternative embodiment, the step of heating 18 comprises heating the mold to 500° C. at a temperature rate increase of approximately 50° C. each three minutes to calcinate the mix to form a calx of alumina in the dehydrated foam of the rigid insulation.

The insulation material of the present invention includes an expanded aluminum potassium sulphate made from the double salt of aluminum potassium sulphate by using the expansion caused when removing the water of hydration. The resulting dehydrated double salt of aluminum potassium sulphate provides an insulation at temperatures up to approximately 500° C. For higher temperatures, the dehydrated double salt of aluminum potassium sulphate is calcined to produce alumina with potassium sulphate which is capable of providing insulation to temperatures up to approximately 1200° C.

Various methods are available for providing the crystalline aluminum potassium sulphate double salt. One method involves adding aluminum sulphate and potassium sulphate in water and cooling below 750° C. depending on the concentration of salt in solution, to produce the double salt of aluminum potassium sulphate crystals with up to twenty-four parts of water of hydration. For example:

$$Al_2(SO_4)_3 + K_2SO_4 + 24H_2O \rightarrow Al_2K_2(SO_4)_4 \cdot 24H_2O$$

crystals in liquor.

Another method is by adding sulfuric acid to aluminum trihydrate and potassium sulphate in water and cooling below 75° C. depending on the concentration of salt in solution, to produce the aluminum double salt of aluminum potassium sulphate crystals with up to twenty-four waters of hydration. For example:

$$2Al(OH)_3 + 3H_2SO_4 + K_2SO_4 + 18H_2O \rightarrow Al_2K_2(SO_4)_4 \cdot 24H_2O$$

crystals in liquor.

Another method is adding alumina or aluminum trihydrate to potassium hydroxide, sulfuric acid in water and cooling below 75° C. depending on the concentration of salt in solution, to produce the double aluminum potassium sulphate double salt of aluminum potassium sulphate. For example:

$$Al_2O_3 + 2KOH + 4H_2SO_4 + 19H_2O \rightarrow Al_2K_2(SO_4)_4 \cdot 24H_2O$$

crystals in liquor.

A further method is to add potassium hydroxide to bauxite, filtering to remove the residue and then adding sulfuric acid and cooling, depending on the concentration of salt in solution, to produce the aluminum potassium double salt of aluminum potassium sulphate.

Another method of acquiring the aluminum and potassium double salt of aluminum potassium sulphate is to add sulfuric acid to calcined bauxite, calcined clay or dry sludge waste tailings from oil sands operations containing alumina and then removing the residue. The leach liquor with the aluminum, which may also have some potassium values depending on its presence in the source sludge fines, is reacted with potassium sulphate or potassium hydroxide. On cooling, depending on the concentration of salt in solution, the liquors, the double salt of aluminum potassium sulphate is formed.

Thus, a number of ways can be used to produce the aluminum and potassium double salt of aluminum potassium sulphate with waters of hydration. When crystallization of the double salt of aluminum potassium sulphate occurs at temperatures above 65° C., the waters of hydration are reduced to six. For example:

$$Al_2K_2(SO_4)_3 \cdot 24H_2O \rightarrow Al_2K_2(SO_4)_4 \cdot 6H_2O + 18H_2O$$

When either of these salts is dehydrated at temperatures in the range between 200° C. and 300° C., expansion of the crystals takes place to provide the required insulation product.

Further, if these dehydrated crystals are then calcined at temperatures of approximately 850° C. and above, the aluminum sulphate portion of the crystal is converted to alumina providing an insulation product which can withstand operating temperatures of 1200° C. For example:

$$Al_2K_2(SO_4)_4 \cdot 6H_2O \rightarrow Al_2K_2(SO_4)_4 + 6H_2O$$

at 200° to 300° C.; and then $$Al_2K_2(SO_4)_4 \rightarrow Al_2O_3 \cdot K_2SO_4 + 3SO_3$$

at 850° C. and above.

In operation, the drying and dehydration of potassium aluminum sulphate crystals may be carried out in a continuous microwave unit or in an indirect heated rotary drum or other such device such as heated screws and jacketed blenders at temperatures between 200° C. and 300° C.

A preferred route is to prepare a liquid solution at 95° C. wherein the aluminum potassium double salt of aluminum potassium sulphate dissolves in its own water of hydration. This can be done in a spray drier wherein the liquid solution is flakes that are formed and collected for use as insulation product.

The expanded matrix of the aluminum potassium sulphate allows for extremely porous lightweight crystal material. The double salt of aluminum potassium sulphate aluminum potassium crystals containing waters of hydration can be dissolved at approximately 95° C. to produce a liquid and then the resultant liquid formed into a spray such that it appears like snowflakes. The resulting material density is in the order of 0.06 grams per cubic centimeter and is useful for producing high temperature insulation for up to 800° C. The insulation material may assume any of various forms, popped popcorn that can be shipped to users in bags, for example.

A further method for structuring the insulation material begins with the double aluminum potassium salt in a powder form, mixing in a binder of gypsum or calcium silicate, putting it in a container, heating it to approximately 250° C. to produce a porous material, and then allowing it to cure and cool. Heating double salts of aluminum potassium sulphate causes it to expand in a foam with a very low bulk density. Such a uniform porous material can be formed into sheets that may be used in construction as plasterboard, insulation board and soundproofing board. Such sheets are very economical to ship and easy to install. This can also apply to pre-formed molds for special shapes, such as required for pipe insulation.

For uniform porous material of bulk density around 0.15, it is important that the container be evenly ventilated to allow for controlled, steady expansion to the shape required. In addition, porous shapes can be easily cut out of blocks of such rigid material.

Thus the double salt of aluminum potassium sulphate expands as it is dehydrated at a temperature in the order of 200° C. to 300° C. It is transformed at these temperatures as the $H_2O$ loses its chemical bond and is driven off. Consequently, there is a resultant insulation material capable of performing from sub-zero to over 500° C. Such have a very low density, in the order of 0.06 grams per cubic centimeter and an R-factor of approximately five for resultant material that is approximately 0.125 inches in thickness.

The "R-factor" is the reciprocal of the thermoconductivity of BTUs per hour per cubic foot per degree Fahrenheit per inch and increases with the thickness of the resultant insulative material.

The insulation material with the double salt of aluminum potassium sulphate can be realized in large production volumes. For example, potash mined from potash mines may be used as a source to provide potassium chloride and potassium sulphate. Sulfuric acid can be added to it. It can then be mixed with bauxite and sulfuric acid to provide the aluminum sulphate salt. Generally, two tons of bauxite and sulfuric acid will make approximately one ton of aluminum sulphate.

Another source includes oil sand tailings, such as those realized from the mines of Altabasca, Canada. Such tailings have potassium and aluminum and when properly leached and treated with sulfuric acid can provide the potassium aluminum double salt of aluminum potassium sulphate. Such process is described in U.S. patent application Ser. No. 08/165,974, filed Dec. 10, 1993, and incorporated herein by reference.

FIGS. 2A, 2B and 2C show a mold 30 for producing molded rigid insulation shapes in the form of parts of hollow cylinders. Such pieces are useful to wrap pipes to provide insulation, e.g., hot water and steam pipes. The mold 30 is comprised of ordinary carbon steel that has been chrome-plated to reduce sticking of the molded pieces to the mold. A series of steam vents 34 allow water vapor to escape the mold 30 when heated. A fill hole 36 allows a dry mix of double salt and binding agent to be inserted within the mold and closed to prevent escape during dehydration foaming.

As described in FIG. 1, the aluminum potassium sulphate double salt is heated and steam formed by boiling waters of hydration in the crystals of the aluminum potassium sulphate double salt foams the material and expands it to conform to the inner confines of the mold 30. Care should be taken to provide for a uniform foam expansion by the gradual application of heat. Flat panels of rigid insulation can, of course, be produced by appropriately reshaping and re-sizing the mold 30.

A hinge 38 joins a bottom half 40 to a top half 42. In FIG. 2B, the top half 42 is swung away from the bottom half 40. In FIG. 2C, a molded piece of rigid insulation 50 comprises an expanded rigid foam 52 of dehydrated aluminum potassium sulphate double salt and binding agent that is withdrawn from the open mold 30. A paper backing 56 is attached to the outside of the piece and another paper backing 54 is applied inside. Preferably, more paper backing is used to finish the edges of the insulation 50 to provide protection from moisture and abrasion. Typically, the carbon releasing agent used in the step 14 of the method 10 will leave a film that covers the rigid foam 52, and is itself covered by the paper backing 54 and 56.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A rigid insulation, comprising:

a rigid foam obtained from a mix of a hydrated crystlline form of a double salt of aluminum potassium sulphate $Al_2K_2(SO_4)_4$ precipitated from a liquor, and a binding agent, wherein heat has been used to dehydrate said double salt of aluminum potassium sulphate to-cause, it and said binding agent to foam and expand within a mold;

a thin-film coating of carbon releasing agent on the foam that provides for a separation of the foam from said mold; and a backing sheet attached to a surface of the foam and releasing agent and providing for moisture and abrasion protection.

2. The rigid insulation of claim 1, wherein:

said binding agent is comprised of equal parts of calcium sulphate $CaSO_4$, calcium silicate $CaSiO_4$ and calcium hydroxide $Ca(OH)_2$ all powder form at a time they are mixed with said double salt of aluminum Potassium sulphate also in a powder form.

3. The rigid insulation of claim 1, wherein:

the foam is heated in said mold at a controlled temperature rate increase and molded into flat panels providing for a strong rigid insulation with a high R-value which is capable of providing thermal insulation.

4. The rigid insulation of claim 1, wherein:

the foam is heated in said mold at a controlled temperature rate increase and molded into hollow half cylinders for insulating pipes with two joined halves.

5. The rigid insulation of claim 1, wherein:

the foam is heated in said mold to 500° C. at a temperature rate increase of approximately 50° C. each three minutes to calcinate said mix to form alumina in a resulting dehydrated foam of the rigid insulation which is capable of providing thermal insulation to approximately 2000° C.

6. The rigid insulation of claim 1, wherein:

the foam is heated in said mold to 250° C. at a controlled temperature rate increase of approximately 50° C. each three minutes and molded into a strong rigid insulation with a high R-value which is capable of providing thermal insulation to approximately 500° C.

* * * * *